(12) United States Patent
Naka

(10) Patent No.: US 9,720,628 B2
(45) Date of Patent: Aug. 1, 2017

(54) INFORMATION PROCESSING SYSTEM, INFORMATION PROCESSING APPARATUS, INFORMATION PROCESSING METHOD, AND STORAGE MEDIUM

(71) Applicant: CANON KABUSHIKI KAISHA, Tokyo (JP)

(72) Inventor: Akiteru Naka, Machida (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/687,706

(22) Filed: Apr. 15, 2015

(65) Prior Publication Data
US 2015/0302281 A1    Oct. 22, 2015

(30) Foreign Application Priority Data
Apr. 17, 2014    (JP) .................. 2014-085866

(51) Int. Cl.
*G06F 15/00*    (2006.01)
*G06F 3/12*    (2006.01)

(52) U.S. Cl.
CPC ............ *G06F 3/12* (2013.01); *G06F 3/1211* (2013.01); *G06F 3/1243* (2013.01); *G06F 3/1285* (2013.01)

(58) Field of Classification Search
CPC ............................ G06K 15/1802; G06F 3/12
USPC ................................................ 358/1.15–1.18
See application file for complete search history.

(56) References Cited

U.S. PATENT DOCUMENTS

2007/0195368 A1* 8/2007 Waara .................. G06F 17/248
                                                                358/1.18
2008/0018935 A1* 1/2008 Gauthier .............. G06F 17/211
                                                                358/1.18

FOREIGN PATENT DOCUMENTS

JP        2013-134748 A    7/2013

* cited by examiner

*Primary Examiner* — Saeid Ebrahimi Dehkordy
(74) *Attorney, Agent, or Firm* — Canon U.S.A., Inc IP Division

(57) ABSTRACT

An information processing system includes a generation unit and a reconstruction unit. The generation unit generates a data source including data to be referred to at a time of printing for a variable portion in which data to be referred to is variable for each record. The reconstruction unit acquires the data source and reconstructs print data that is variable for each record. The generation unit executes processing of determining a largest size based on a size of data to be referred to for the variable portion to generate stub data of the determined size, of generating the print data by using the stub data, and of generating the data source for each record. The reconstruction unit executes processing of reconstructing the print data by overwriting the stub data in the print data with the data in the acquired data source.

5 Claims, 23 Drawing Sheets

FIG. 3

| ID | TYPE | SIZE | DATA | |
|---|---|---|---|---|
| 001 | TEXT | 25 BYTES | A.txt | ~401 |
| 002 | IMAGE | 9600 BYTES | A.jpg | ~402 |
| 003 | IMAGE | 12800 BYTES | B.jpg | ~403 |
| 004 | TEXT | 100 BYTES | B.txt | ~404 |
| 005 | IMAGE | 9800 BYTES | C.jpg | ~405 |
| 006 | IMAGE | 5400 BYTES | D.jpg | ~406 |
| 007 | TEXT | 50 BYTES | C.txt | ~407 |
| 008 | IMAGE | 11000 BYTES | E.jpg | ~408 |
| 009 | IMAGE | 12000 BYTES | F.jpg | ~409 |
| 010 | TEXT | 55 BYTES | D.txt | ~410 |

FIG. 7A

```
%PDF-1.4
...
7 0 obj <</Type /Page
>>
...                                802
23 0 obj % FIXED PORTION
<< /Length xxx >>
xxxxxxxxxxxxxxxxxxxxxxx
xxxxxxxxxxxxxxxxxxxxxxx
xxxxxxxxxxxxxxxxxxxxxxx
endobj
...

801
xref
0 56
0000000003 00000 f
0000000016 00000 n
0000000112 00000 n
...
0000000183 00000 n
...

trailer
<</Size 56 ...>>
startxref
xxx
%%EOF
```

803 → (points to 23 0 obj)

FIG. 7B

```
%PDF-1.4
...
7 0 obj <</Type /Page
>>
...
23 0 obj % FIXED PORTION
<< /Length xxx >>
xxxxxxxxxxxxxxxxxxxxxxxx
xxxxxxxxxxxxxxxxxxxxxxxx
xxxxxxxxxxxxxxxxxxxxxxxx
endobj
24 0 obj % VARIABLE PORTION(IMAGE)
<< /Length 12800 >>          ~807
xxxxxxxxxxxxxxxxxxxxxxxx
xxxxxxxxxxxxxxxxxxxxxxxx
xxxxxxxxxxxxxxxxxxxxxxxx
xxxxxxxxxxxxxxxxxxxxxxxx
xxxxxxxxxxxxxxxxxxxxxxxx
endobj
                                805 xref
0 56
0000000003 00000 f
0000000016 00000 n
0000000112 00000 n
...
0000000183 00000 n
0000001503 00000 n
...
trailer
<</Size 56 ...>>          804
startxref
xxx
%%EOF
```

806 points to object 24 0 (VARIABLE PORTION)

FIG. 8

```
%PDF-1.4
...
7 0 obj <</Type /Page
>>
...
23 0 obj FIXED PORTION
<< /Length xxx >>
xxxxxxxxxxxxxxxxxxxxxxx
xxxxxxxxxxxxxxxxxxxxxxx
xxxxxxxxxxxxxxxxxxxxxxx
endobj
24 0 obj % VARIABLE PORTION(IMAGE)
<< /Length 12800 >>
xxxxxxxxxxxxxxxxxxxxxxx
xxxxxxxxxxxxxxxxxxxxxxx
xxxxxxxxxxxxxxxxxxxxxxx
xxxxxxxxxxxxxxxxxxxxxxx
xxxxxxxxxxxxxxxxxxxxxxx
endobj
25 0 obj % VARIABLE PORTION(TEXT)
<< /Length 100 >>          ~811
xxxxxxxxxxxxxxxxxxxxxxx
endobj                                  ~809
xref
0 56
0000000003 00000 f
0000000016 00000 n
0000000112 00000 n
...
0000000183 00000 n
0000001503 00000 n
0000015555 00000 n          ~808
...
trailer
<</Size 56 ...>>
startxref
xxx
%%EOF
```

810 → (points to 25 0 obj line)

FIG. 9A

| ID | OBJECT 1 | | | OBJECT 2 | | |
|---|---|---|---|---|---|---|
| | 901 | 902 | 903 | 901 | 902 | 903 |
| 001 | (1520, | 9630 BYTES, | A.jpg.dat) | (15600, | 55 BYTES, | A.txt.dat) |
| 002 | (1520, | 12830 BYTES, | B.jpg.dat) | (15600, | 130 BYTES, | B.txt.dat) |
| 003 | (1520, | 9630 BYTES, | A.jpg.dat) | (15600, | 130 BYTES, | B.txt.dat) |
| 004 | (1520, | 9830 BYTES, | C.jpg.dat) | (15600, | 80 BYTES, | C.txt.dat) |

```
<< /Length 9600 >>  ← 908
xxxxxxxxxxxxxxxxxxxx
xxxxxxxxxxxxxxxxxxxx ← 909
xxxxxxxxxxxxxxxx
endobj  ← 910
```

FIG. 9C

```
<< /Length 30 >>  ← 911
xxxxxxxxxxxxxxxxxxxx ← 912
endobj  ← 913
```

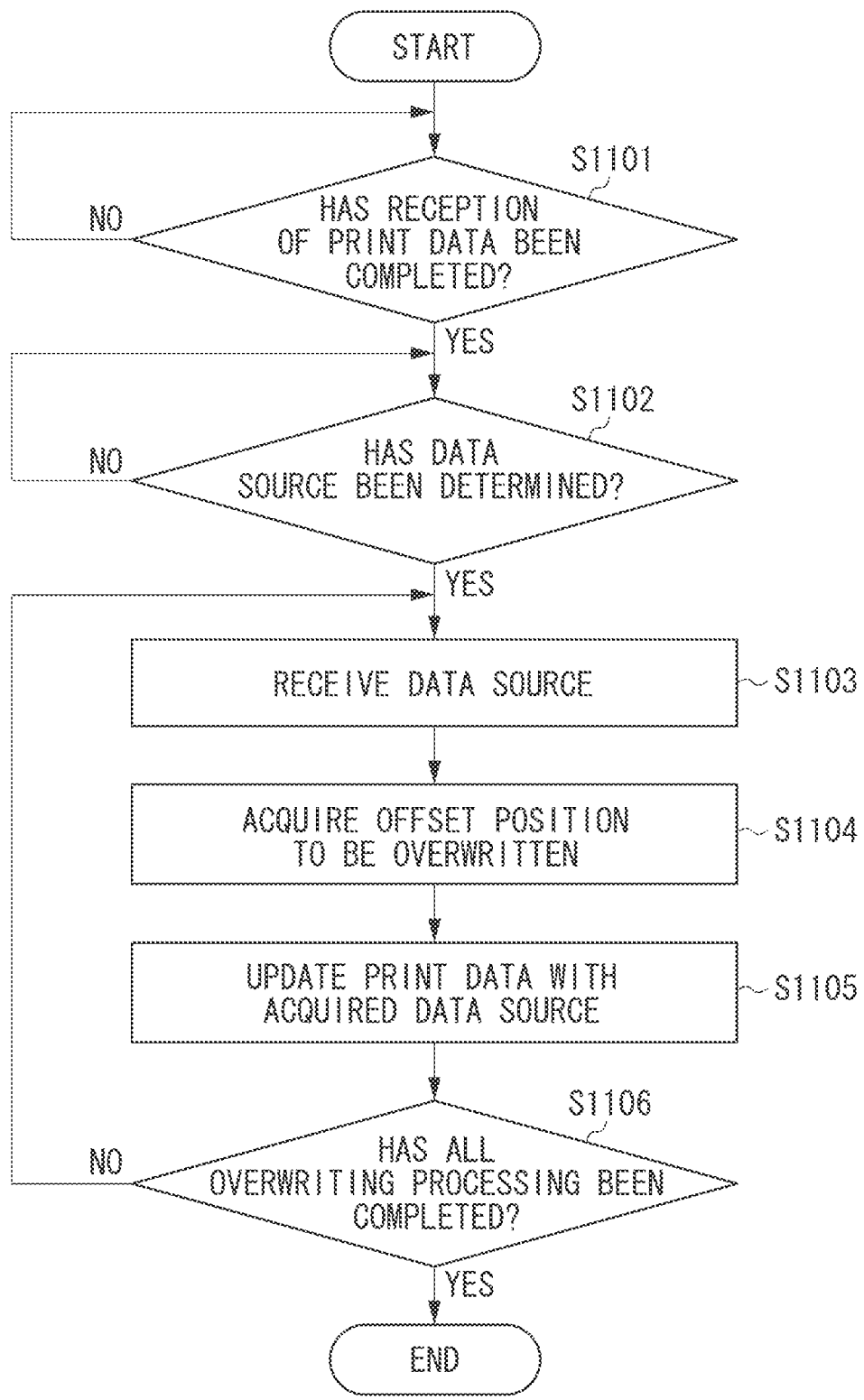

FIG. 12

```
%PDF-1.4
...
7 0 obj<</Type /Page
>>
...
23 0 obj FIXED PORTION
<< /Length xxx >>
xxxxxxxxxxxxxxxxxxxxxxx
xxxxxxxxxxxxxxxxxxxxxxx
xxxxxxxxxxxxxxxxxxxxxx
endobj
24 0 obj  % VARIABLE PORTION(IMAGE)
<< /Length 9600 >>
XXXXXXXXXXXXXXXXXX
XXXXXXXXXXXXXXXXXX
XXXXXXXXXXXXXXX
endobj
xxxxxxxxxxxxxxxxxxxxxxx
xxxxxxxxxxxxxxxxxxxxxxx
xxxxx
endobj 25 0 obj  % VARIABLE PORTION(TEXT)
<< /Length 25 >>
XXXXXXXX
endobj
xxxxxxxxxxxxxxx
endobj
xref
0 56
0000000003 00000 f
0000000016 00000 n
0000000112 00000 n
...
0000000183 00000 n
0000001503 00000 n
0000015555 00000 n
...
trailer
<</Size 56 ...>>
startxref
xxx
%%EOF
```

- 1202 (VARIABLE PORTION (IMAGE) block)
- 1201
- 1204 (VARIABLE PORTION (TEXT) block)
- 1203
- 1205 (xref block)

FIG. 14A

```
%PDF-1.4
...
7 0 obj <</Type /Page
>>
...
23 0 obj  % FIXED PORTION
<< /Length xxx >>
xxxxxxxxxxxxxxxxxxxxxxxxx
xxxxxxxxxxxxxxxxxxxxxxxxx
xxxxxxxxxxxxxxxxxxxxxxxxx
endobj
```
— 1501

FIG. 14B

```
%PDF-1.4
...
7 0 obj <</Type /Page
>>
...
23 0 obj % FIXED PORTION
<< /Length xxx >>
xxxxxxxxxxxxxxxxxxxxxxxx
xxxxxxxxxxxxxxxxxxxxxxxx
xxxxxxxxxxxxxxxxxxxxxxxx
endobj
24 0 obj % VARIABLE PORTION(IMAGE)
<< /Length 100 >>
xxxxxxxxxxxxxxxxxxxxxxxx
xxxxxxxxxxxx
endobj
25 0 obj % VARIABLE PORTION(TEXT)
<< /Length 10 >>
xxxxxxxxxx
endobj
xref
0 56
0000000003 00000 f
0000000016 00000 n
0000000112 00000 n
...
0000000183 00000 n
0000001555 00000 n
0000001655 00000 n
...
trailer
<</Size 56 ...>>
startxref
xxx
%%EOF
```

- 1505 → 23 0 obj (FIXED PORTION)
- 1502: 24 0 obj VARIABLE PORTION (IMAGE)
- 1503: 25 0 obj VARIABLE PORTION (TEXT)
- 1504: xref section
- 1506, 1507: references to xref entries

FIG. 15A

| ID | REPLACEMENT DATA | | |
|---|---|---|---|
| 001 | (1555, | 10330 BYTES, | A.jpg.A.txt.dat) ~1604 |
| 002 | (1555, | 13600 BYTES, | B.jpg.B.txt.dat) |
| 003 | (1555, | 10400 BYTES, | A.jpg.B.txt.dat) |
| 004 | (1555, | 10550 BYTES, | C.jpg.C.txt.dat) |
|  | 1601 | 1602 | 1603 |

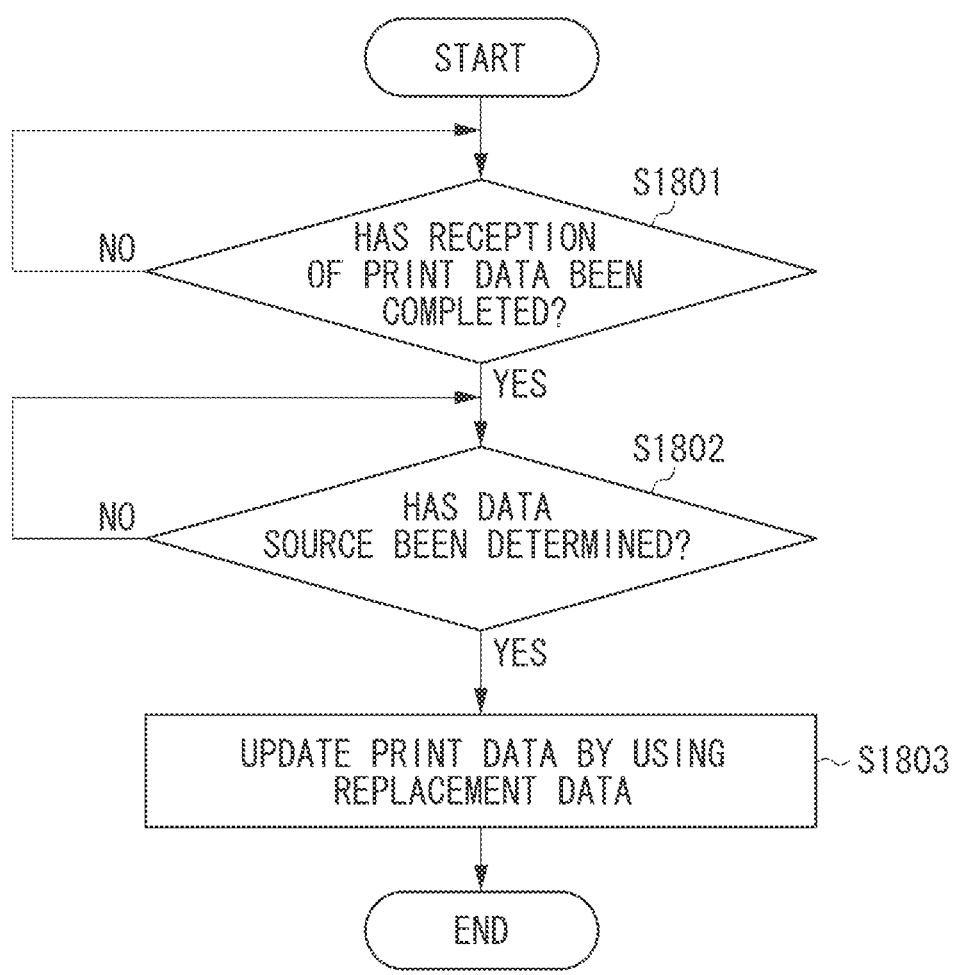

FIG. 18

```
%PDF-1.4
...
7 0 obj <</Type /Page
>>
...
23 0 obj % FIXED PORTION
<< /Length xxx >>
xxxxxxxxxxxxxxxxxxxxxxx
xxxxxxxxxxxxxxxxxxxxxxx
xxxxxxxxxxxxxxxxxxxxxxx
Endobj
```
— 1901

```
24 0 obj
<< /Length 9600 >>
xxxxxxxxxxxxxxxxxxxxxxx
xxxxxxxxxxxxxxxxxxxxxxx
xxxxxxxxxxxxxxxx
endobj 25 0 obj
<< /Length 30 >>
xxxxxxxxxxxxxxxxxxxxxxx
endobj
```
— 1902
— 1903

```
xref
0 56
0000000003 00000 f
0000000016 00000 n
0000000112 00000 n
...
0000000183 00000 n
0000001555 00000 n
000000xxxx 00000 n
trailer
<</Size 56 ...>>
startxref
xxx
%%EOF
```
— 1904

```
%PDF-1.4                          — 2001
...
7 0 obj <</Type /Page             — 2005
/Resources <</XObject <<
/Im0 23 0 R   — 2006
/Im1 24 0 R   — 2007
/Im2 25 0 R   — 2008
>> >> >>
endobj
...
23 0 obj                          — 2002
<< /Length 100 >>
xxxxxxxxxxxxxxxxxxxxxxxxxx        — 2009
endobj 24 0 obj
<< /Length 100 >>
xxxxxxxxxxxxxxxxxxxxxxxxxx        — 2010
xxxxxxxxxxxxx
endobj 25 0 obj
<< /Length 10 >>
xxxxxxxxx x                       — 2011
endobj xref
0 56
0000000003 00000 f
0000000016 00000 n   — 2012
0000000112 00000 n                — 2003
...
0000000183 00000 n   — 2013
0000001555 00000 n
0000001655 00000 n
...
trailer
<</Size 56 ...>>
startxref                         — 2004
xxx
%%EOF
```

2014

INFORMATION PROCESSING SYSTEM, INFORMATION PROCESSING APPARATUS, INFORMATION PROCESSING METHOD, AND STORAGE MEDIUM

BACKGROUND OF THE INVENTION

Field of the Invention

The present invention relates to a technique of generating, analyzing, and reconstructing print data.

Description of the Related Art

In recent years, improvements in speed and quality of digital printers have expanded a print-on-demand (POD) market. The POD is a service of printing electronic data using a digital printer and performing variable data printing (VDP) by utilizing characteristics of using electronic data. A document used in the VDP is divided into a fixed portion and a variable portion. Data in the variable portion is supplied from a data source such as a comma separated values (CSV) file. Different contents are printed by associating a column of the data source with the variable portion of a template document, and applying the association to each row (record) in the data source. Thus, there is an advantage that a printed product suitable for each client can be produced because contents of printing can be changed among clients. Herein, a set of logical information such as a page layout and a data source required for a single VDP is referred to as "VDP document" and physical electronic data related to the VDP document is referred to as "VDP data". In many cases, a dedicated page description language (PDL) is used for the VDP data. The PDL dedicated to the VDP can be described in such a way that an object in the fixed portion in the VDP document (hereinafter, referred to as a fixed object) is defined in advance to be referred later. When print using the PDL is performed, a result of analyzing each fixed object is stored, and the result of the analysis processing is copied each time the fixed object is referred to. Thus, the processing for the entire VDP data can be executed at a higher speed. In other words, the PDL dedicated to the VDP can describe a VDP document that can be efficiently processed by an application analyzing VDP data.

As the PDL dedicated to the VDP, PDF/VT is available. Portable Document Format (PDF) has been widely used for print data. PDF/VT is the PDL based on PDF and thus is highly suitable for a workflow using PDF print data. However, there is a problem that PDF/VT needs to have a large amount of page information, and thus involves a large amount of data. More specifically, the number of records of data sources in the VDP is large in general, and thus the amount of page information is large. As a result, the data amount as a whole becomes huge. The page information includes data on graphics in a corresponding page and attribute information on the page.

Japanese Patent Application Laid-Open No. 2013-134748 discusses a method of dividing VDP data into print data and a data source and combining the print data and the data source when printing is performed. The print data includes page information for a single record and configuration information on a variable portion that dynamically varies among records. The configuration information on the variable portion is combined with the data source when the printing is performed. As a result, the amount of print data can be reduced to data for a single record.

However, the method discussed in Japanese Patent Application Laid-Open No. 2013-134748 requires special combining processing for converting the configuration information on the variable portion using the data source. In the VDP data format such as PDF/VT, the print data has the number of expanded page objects corresponding to the number of the records, and thus the data amount increases with the number of records. All things considered, special combining processing is required for performing printing with the print data, having the data amount reduced to that for a single record, while dynamically changing the print data for each record.

The present invention is directed to a technique for suppressing an amount of print data even when the number of records is large, and performing print processing without the special combining processing.

SUMMARY OF THE INVENTION

An information processing system according to a first aspect of the present invention includes a generation unit configured to generate a data source including data to be referred to at a time of printing for a variable portion in which data to be referred to is variable for each record, and a reconstruction unit configured to acquire the data source and reconstruct print data that is variable for each record, wherein the generation unit executes processing of determining a largest size based on a size of data to be referred to for the variable portion to generate stub data of the determined size, of generating the print data by using the stub data, and of generating the data source for each record, and wherein the reconstruction unit executes processing of reconstructing the print data by overwriting the stub data in the print data with the data in the acquired data source.

An information processing system according to a second aspect of the present invention includes a generation unit configured to generate a data source including data to be referred to at a time of printing for a variable portion in which data to be referred to is variable for each record, and an update unit configured to acquire the data source and update print data that is variable for each record, wherein the generation unit executes processing of generating stub data, of adding the variable portion to the print data by using the stub data, and of generating the data source for each record by using replacement data to be replaced with the stub data at the time of printing, and wherein the update unit executes the processing of updating the print data by replacing the stub data in the print data with the replacement data.

Further features of the present invention will become apparent from the following description of exemplary embodiments (with reference to the attached drawings).

BRIEF DESCRIPTION OF THE DRAWINGS

FIG. 3 is an image diagram illustrating a database.

FIGS. 7A and 7B are image diagrams each illustrating print data according to a first exemplary embodiment of the present invention.

FIG. 8 is an image diagram illustrating print data in a state where stub text data has been output.

FIGS. 9A, 9B, and 9C are image diagrams illustrating a data source according to the first exemplary embodiment.

FIG. 11 is a flowchart illustrating reconstruction processing for print data.

FIG. 12 is an image diagram illustrating print data obtained as a result of the reconstruction processing.

FIGS. 14A and 14B are image diagrams each illustrating print data according to the second exemplary embodiment.

FIGS. 15A and 15B are image diagrams illustrating a data source according to the second exemplary embodiment.

FIG. 17 is a flowchart illustrating update processing for the print data according to the second exemplary embodiment.

FIG. 18 is an image diagram illustrating print data obtained as a result of the update processing.

FIG. 19 is an image diagram illustrating a structure of PDF data.

DESCRIPTION OF THE EMBODIMENTS

Exemplary embodiments of the present invention are described below with reference to the attached drawings.

Figure 1A:
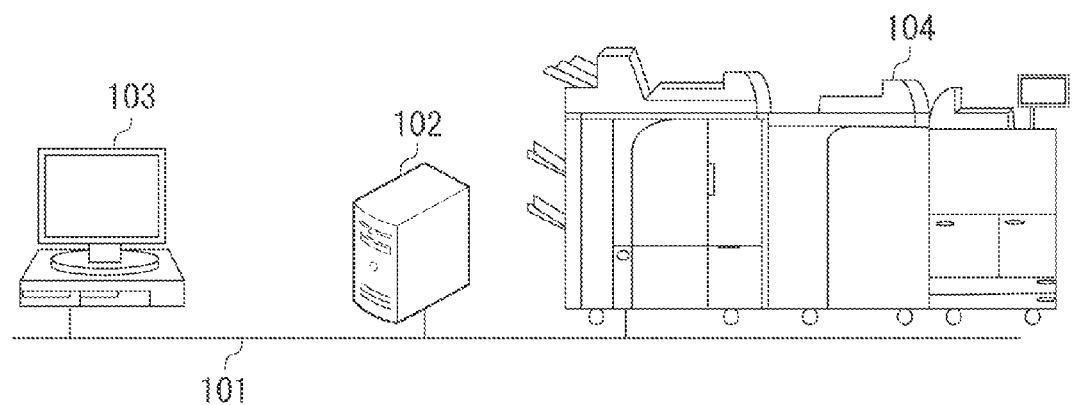
FIGS. 1A and 1B are diagrams illustrating configurations of an information processing system and an information processing apparatus according to an exemplary embodiment of the present invention.

FIG. 1A is a schematic diagram illustrating an information processing apparatus used in an information processing system according to an exemplary embodiment of the present invention. The information processing apparatuses are a server computer (hereinafter referred to as a server) 102, a client computer (hereinafter referred to as a client) 103, and a printer apparatus 104. The information processing apparatuses are connected to one another via a network 101 and transmit and receive information to and from one another. The server 102 manages transmission and reception of data between the apparatuses connected to the network 101. The client 103 can edit print data and transmits the print data to the printer apparatus 104 and the server 102 via the network 101. Upon receiving the print data, the printer apparatus 104 communicates with the server 102 as necessary to start a printing operation. A user of the client 103 can create and edit data by starting an application, and thus can generate data in a predetermined format such as PDF data for example. A structure of PDF data is described with reference to FIG. 19.

PDF data includes a header portion 2001, a body portion 2002, a cross reference list 2003, and a trailer 2004. The body portion 2002 includes reference and definition information on resources forming a page. The definition information includes a start tag starting with an object number and an end tag. For example, a range of definition information 2005 related to the page starts with "7 0 obj" and ends with "endobj". The definition information 2005 includes, for example, "23 0 R" as first reference information 2006, "24 0 R" as second reference information 2007, and "25 0 R" as third reference information 2008, as reference information starting with an object number. This indicates that PDF data separately has a definition with an object number, and the definition is referred to in the page. For example, the first reference information 2006 is reference information for an object number 23, and for referring to a resource 2009 with the object number 23 defined as "23 0 obj". The resource 2009 with the object number 23 holds actual data in a range starting from a "23 0 obj" tag to an "endobj" tag, and has a Length tag indicating that a data size is 100 bytes. The actual data includes image data such as Joint Photographic Experts Group (JPEG) data and text data formed of a character string. A type of each resource is defined using a Type tag, a SubType tag, and the like in addition to the Length tag. The second reference information 2007 and the third reference information 2008 have similar configurations and indicate reference to a resource 2010 with an object number 24 and a resource 2011 with an object number 25, respectively.

The cross reference list 2003 holds position information indicating a position where each resource is defined in a file. The cross reference list 2003 includes entries in a form of "nnnnnnnnnn ggggg n" starting with a digit number. With the entries, where the resources with an object number 0 to an object number X are defined can be identified. For example, an entry 2012 for the object number 1 is "0000000016", and an entry 2013 for the object number 23 is "0000000183". Thus, the user can recognize that the definition of the object number 1 starts at the 16th byte from the beginning of the file. Furthermore, the user can recognize that definition information 2014 with the object number 23 starts at the 183rd byte from the beginning of the file.

In the PDF data, the resources are defined/referred to by using the object numbers, and the defined positions are managed by using the cross reference list 2003. Thus, the user who edits the PDF data should be careful not to ruin the object definition/reference relationship and should pay attention to the position information managed in the cross reference list 2003.

A configuration common to the server 102, the client 103, and the printer apparatus 104 is described with reference to a block diagram illustrated in FIG. 1B.

A control unit 201 includes a central processing unit (CPU) and controls a display unit 202, an input unit 203, and the like. The display unit 202 includes a display device such as a cathode ray tube (CRT) and a liquid crystal monitor. The input unit 203 receives a user operation signal input by using a keyboard or a pointing device such as a mouse, and notifies the control unit 201 of the user operation. A random access memory (RAM) 204 is a nonvolatile memory. The RAM 204 stores various program codes loaded onto the RAM 204 from a read only memory (ROM) 205 and stores other data files. The ROM 205 stores a computer program executed by the CPU of the control unit 201. An external storage device 206 includes, for example, a hard disk and a driving unit that writes and reads data to and from the hard disk. The external storage device 206, which can also access data stored in another hard disk via a network, stores data required for printing.

The present exemplary embodiment is described using an example case where the program code is loaded onto the RAM 204, but the program code may be read from the ROM 205 and directly executed by the CPU. Further, the data to be processed is on the RAM 204 in the description below, but may all be on the external storage device 206. In such a case, the data may be loaded onto the RAM 204 from the external storage device 206 as necessary to be used. Alternatively, the data may be on a cache memory of the control unit 201. The printer apparatus 104, as an image forming apparatus, includes components such as a printer engine that executes printing processing and a paper feed/discharge unit, other than the components illustrated in FIG. 1B. Description of such known components will be omitted.

Figure 2:
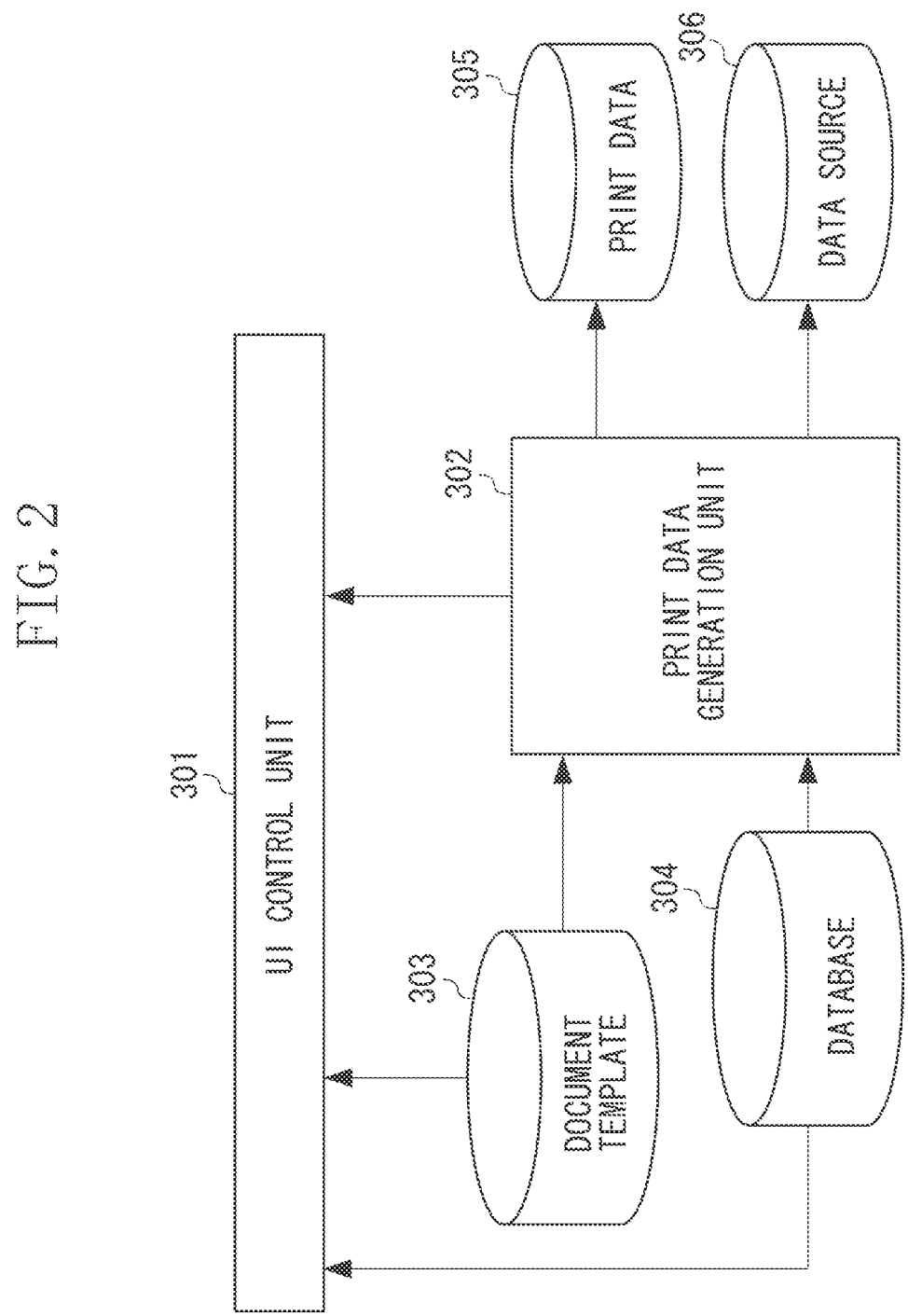
FIG. 2 is a data flow diagram according to an exemplary embodiment of the present invention.

FIG. 2 is a data flow diagram illustrating a relationship between a program code and data processed in the present exemplary embodiment. The client 103 operates in accordance with the data flow.

Figure 1B:
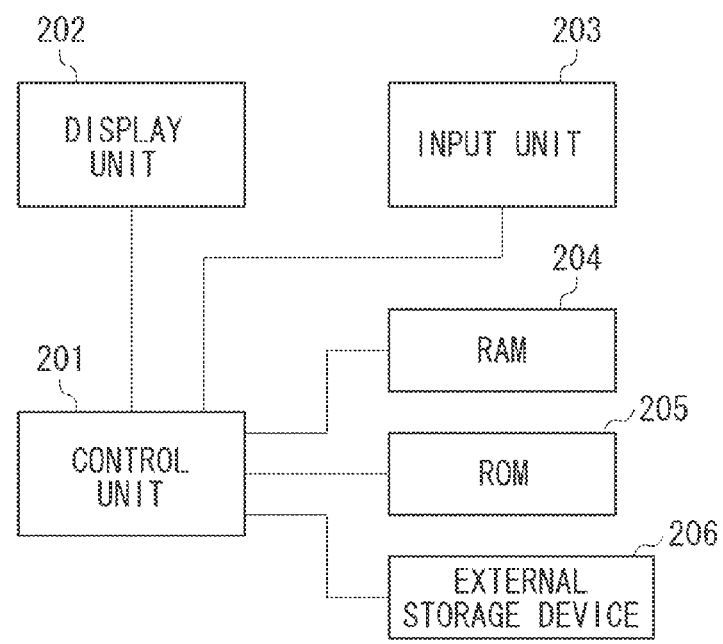

A user interface (UI) control unit 301 is in charge of data input via the input unit 203 illustrated in FIG. 1B. The user can issue an instruction to a print data generation unit 302 from the UI control unit 301. The UI control unit 301 performs control so that a document template 303 and a database (hereinafter referred to as a DB) 304 are loaded from the external storage device 206 illustrated in FIG. 1B and the like, and are displayed on the display unit 202 illustrated in FIG. 1B. The document template 303 is information required for generating PDL data such as print data 305. The document template 303 includes a fixed portion that does not vary among records and a variable portion for which reference is made to information in the DB 304 for each record. The DB 304 includes actual data to be referred to for the variable portion of the document template 303. The print data generation unit 302 generates the print data 305 and a data source 306 to be input to the printer apparatus 104, using data from the document template 303 and the DB 304. The print data 305 is formed of the PDL data such as PDF data. The data source 306 includes actual data that is actually referred to for the variable portion of the document template 303 at the time of printing.

FIG. 3 illustrates an example of a table representing a structure of the DB 304. The DB 304 includes identification (ID) information, a type (e.g., text and image), a size, and data. The data is actually represented by a file name or a file path, and can be directly read and acquired from a file based on the file name in the DB 304. For example, in a case of an ID 001, text data 401 is acquired from "A.txt" of 25 bytes, and in a case of an ID 002, image data 402 is acquired from "A.jpg" of 9600 bytes. The same applies to an ID 003 and subsequent IDs.

Figure 4A:
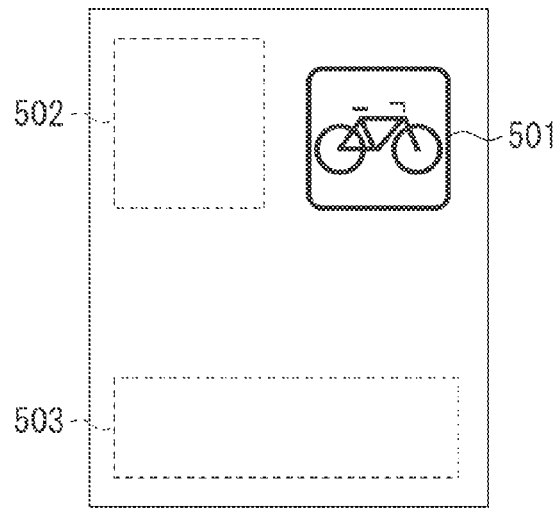
FIGS. 4A, 4B, and 4C are image diagrams illustrating a document template and print data.

FIG. 4A is a schematic diagram illustrating an example of an image obtained when the UI control unit 301 displays the document template 303 on a screen of the display unit 202. The document template 303 includes a fixed portion 501, a variable image portion 502, and a variable text portion 503. Data used for the fixed portion 501 is fixed, and thus an image at the time of printing is displayed on the fixed portion 501. The variable image portion 502 and the variable text portion 503 are variable for each record, and thus only an area is displayed in each of the variable image portion 502 and the variable text portion 503.

Figure 4B:
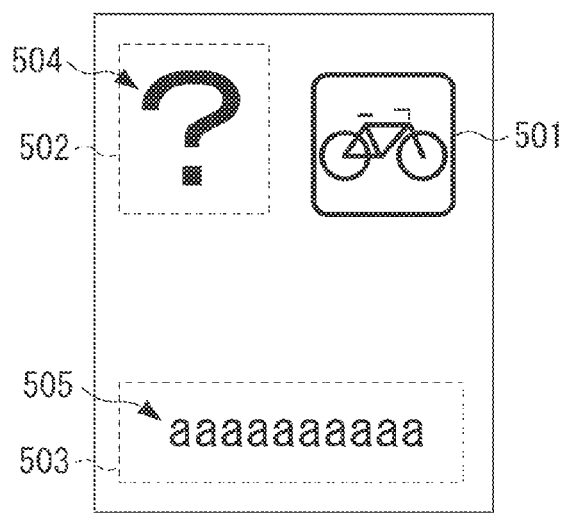

FIG. 4B is a schematic diagram illustrating an image obtained when the UI control unit 301 displays the print data 305 on the screen of the display unit 202. FIG. 4B illustrates a case where stub image data 504 is applied to the variable image portion 502 and stub text data 505 is applied to the variable text portion 503, in the print data 305. Stub data is temporal data, prepared before printing, for the variable portion referring to actual data that differs for each record. In the print data 305, before printing is performed, the portions that are variable for each record are displayed as data to be replaced by using the stub image data 504 and the stub text data 505. When the print data 305 is printed, the stub data in the variable portion is replaced with the actual data that is variable for each record. Thus, printed results different among records are provided.

Figure 5A:
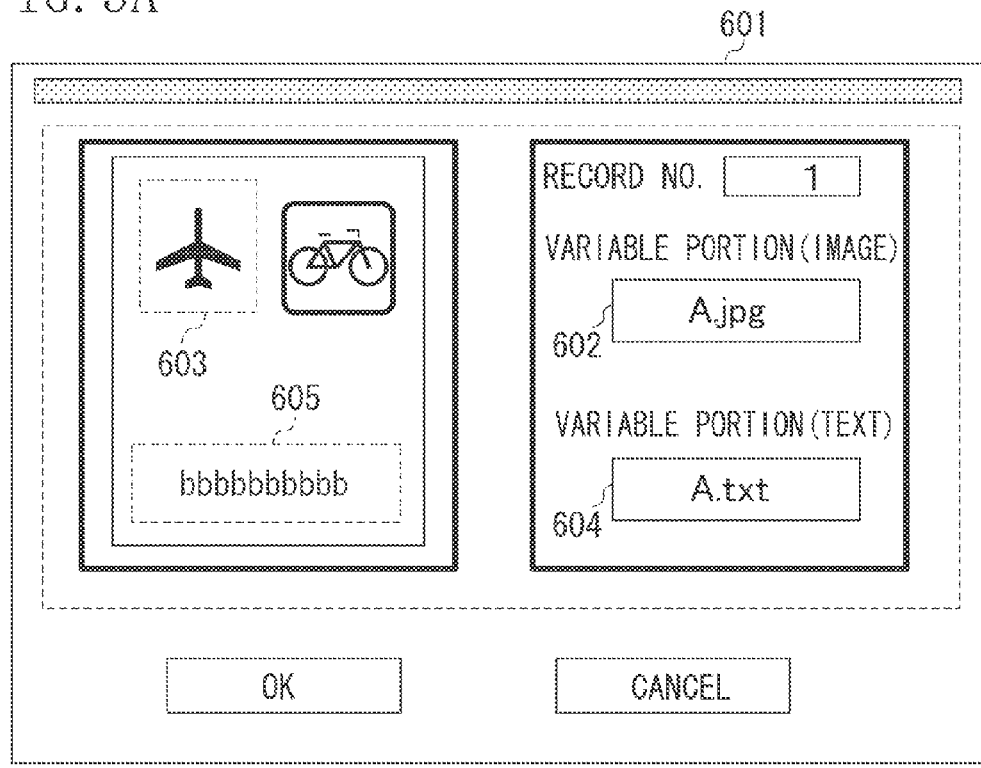
FIGS. 5A and 5B are image diagrams each illustrating a user interface (UI) screen for determining variable portions.
Figure 5B:
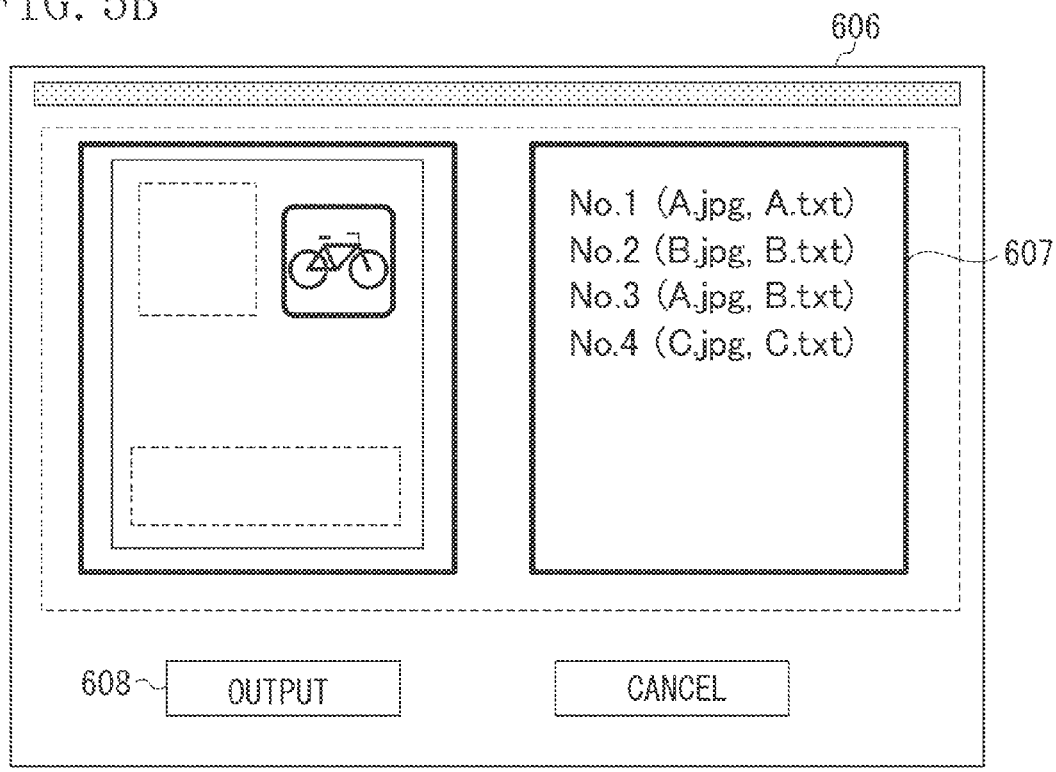

FIGS. 5A and 5B are image diagrams of the UI control unit 301 related to processing of generating the print data 305 and the data source 306, using data input from the document template 303 and the DB 304. In an editing screen 601 in FIG. 5A, the user can select actual data, to be referred to for the variable portion, from the DB 304, while previewing the document template 303. A text editor portion 602 for image selection illustrates a state where an image file "A.jpg" has been selected. A preview image is displayed on a display area 603 from which how the selected data will be actually printed can be checked. Similarly, a text editor portion 604 for text selection illustrates a state where a text file "A.txt" has been selected. A preview character string is displayed on a display area 605 from which how the selected data will be actually printed can be checked. As described above, for the variable portions in the document template 303, data used at the time of printing is determined in advance by using the editing screen 601.

The print data 305 and the data source 306, as results of the editing according to a user operation on the editing screen 601, are eventually output to an output screen 606 illustrated in FIG. 5B. The results of the editing using the editing screen 601 are displayed on an output list 607. The output list 607 illustrates a state where four records have been generated. For example, "A.jpg" and "A.txt" are used for the variable portions in a first record (No1) and "B.jpg" and "B.txt" are used for the variable portions in a second record (No2). When the user operates an output button 608 while the output list 607 described above is being displayed, the processing of generating the print data 305 and the data source 306 starts.

Next, various exemplary embodiments are described. Processing procedures in flowcharts described below are merely examples, and the present invention can be implemented with processing combined in various ways, with a plurality of processing combined into one, or with processing subdivided. Processing procedures may each be extracted to serve as a single functional element, or may be combined with another processing to be executed.

A first exemplary embodiment of the present invention is described below with reference to the drawings.

Figure 6:
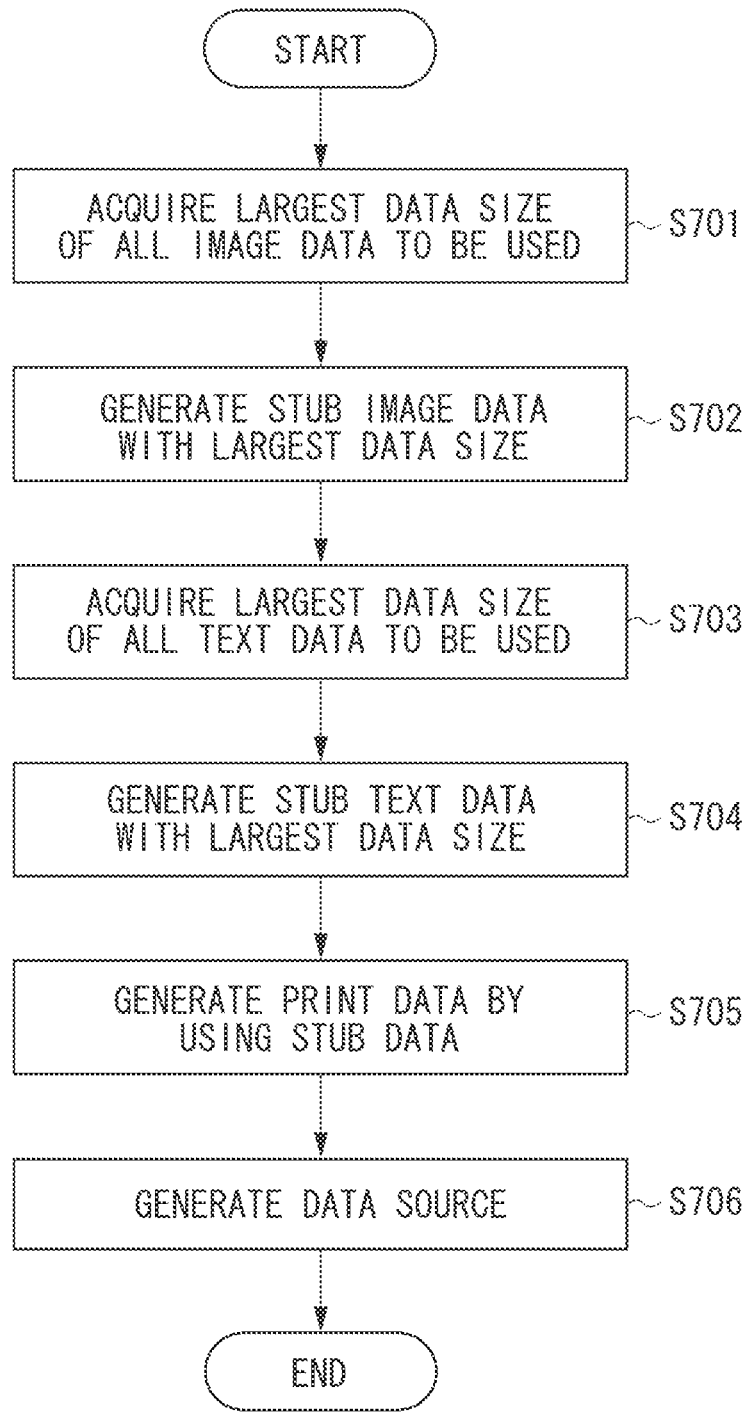
FIG. 6 is a flowchart illustrating an example of processing of generating the print data and a data source.

FIG. 6 is a flowchart illustrating an example of a flow of the processing of generating the print data 305 and the data source 306 executed by the print data generation unit 302. A description is given below using a PDF file as an example of the print data 305. When the user operates the output button 608 illustrated in FIG. 5B, the processing proceeds to step S701.

When the UI control unit 301 instructs the print data generation unit 302 to start the processing, the print data generation unit 302 executes processing of acquiring the largest data size of all the image data to be used, in step S701. In a case of the output list 607 illustrated in FIG. 5B, there are four target records, and data sizes of image data of the four records are acquired. The image data to be used is "A.jpg", "B.jpg", and "C.jpg", and thus the print data generation unit 302 refers to a size column in FIG. 3, and acquires 12800 bytes as the largest data size of the image data to be used (see "B.jpg").

Next, in step S702, the print data generation unit 302 executes processing of generating stub image data, having the largest data size acquired in step S701, to be prepared in the print data 305. In the case of the output list 607 illustrated in FIG. 5B, the stub image data of 12800 bytes (largest data size) is generated. The stub image data is generated by compressing image data prepared in advance, in accordance with a required data size. The print data generation unit 302 is configured to add data without violating a file format, to make fine adjustment on the size of image data. For example, when the print data 305 is a JPG file, the size of the stub image data is adjusted by changing the size of a comment portion of an exchangeable image file format (EXIF) tag.

In step S703, the print data generation unit 302 executes processing of acquiring the largest data size of all the text data to be used. In the case of the output list 607, illustrated in FIG. 5B, there are four target records, and data sizes of text data of the four records are acquired. The text data to be used is "A.txt", "B. txt", and "C. txt", and thus the print data generation unit 302 refers to the size column in FIG. 3, and acquires 100 bytes as the largest data size of the text data (see "B.txt"). Then, in step S704, the print data generation unit 302 executes processing of generating the stub text data, having the largest data size acquired in step S703, to be prepared in the print data 305. In the case of the output list 607 illustrated in FIG. 5B, the stub text data of 100 bytes as the largest data size is generated. The stub text data can be generated as a string of characters, each having a size of a single byte, to form a certain length of data. For example, "a" may be selected as the character having the size of a single byte, and when 10 bytes are required, the stub text data may be obtained as a string of 10 consecutive flans, i.e., "aaaaaaaaaa".

In step S705, the print data generation unit 302 executes processing of generating the print data 305 by using the document template 303, the stub image data generated in step S702, and the stub text data generated in step S704. First of all, the print data generation unit 302 acquires the total size of the header portion 2001, the fixed portion, and the variable portion, to acquire the position of the cross reference list 2003 from the beginning of the file (see FIG. 19). As the size of the header portion 2001, which needs not to be changed among outputs, the fixed size prepared in advance is acquired. When the document template 303 is determined, the size of the data to be used for the fixed portion can be acquired. The size of the stub data to be used for the variable portion has been determined. Thus, the size of the variable portion can be similarly acquired. The position of the cross reference list 2003 to be finally output is determined by summing up all the acquired sizes. The print data generation unit 302 outputs the cross reference list 2003 as well as the header portion 2001, the fixed portion, and the variable portion.

FIGS. 7A and 7B illustrate an example of the print data 305 output in step S705. More specifically, a PDF file in a case where the output list 607 in FIG. 5B is selected for the document template 303 in FIG. 4A is illustrated as an example.

First, described below is the print data 305 in a state where a fixed portion 802 in the document template 303 has been output. FIG. 7A illustrates a state where an output position of the fixed portion 802 of the print data 305 has been determined, and a cross reference list 801 indicates the position of the fixed portion 802 of the print data 305. More specifically, the fixed portion 802 of the print data 305 starts at the 183th byte from the beginning of the file as indicated by a reference position 803 corresponding to an entry "0000000183" in the cross reference list 801. As described above, the output position of the cross reference list 801 from the beginning of the file has been determined in advance, because the total size of the header portion, the fixed portion, and the variable portion has been acquired in step S705 in FIG. 6.

Described next is the print data 305 in a state where the stub image data generated in step S702 in FIG. 6 has been output. FIG. 7B illustrates a state where the output position of the stub image data 805 generated in step S702 has been determined and a cross reference list 804 indicates a position of the stub image data. More specifically, the stub image data 805 starts at the 1503th byte from the beginning of the file as indicated by a reference position 806 corresponding to an entry "0000001503" in the cross reference list 804. A Length tag 807 is used for the size of the stub image data 805, and thus 12800 is output. Tags required for image data when the print data 305 is output are output in a similar manner. Various aspects such as a width, a height, a format, and an indent can be designated with the tags required for image data. All the tags that can be set other than those can be designated.

The print data 305, in a state where the stub text data generated in step S704 in FIG. 6 has been output, is described with reference to FIG. 8. FIG. 8 illustrates a state where an output position of stub text data 809 generated in step S704 has been determined, and a cross reference list 808 indicates a position of the stub text data 809. More specifically, the stub text data 809 starts at the 15555th byte from the beginning of the file as indicated by a reference position 810 corresponding to an entry "0000015555" in the cross reference list 808. A Length tag 811 is used for the size of the stub text data 809, and thus 100 is output. Tags required for text data when the print data 305 is output are output in a similar manner, but description thereof will be omitted.

The print data 305 is generated by using the stub image data and the stub text data as described above. The processing of generating the fixed portion and the variable portion of the print data 305 in this order described above is merely an example. The portions may be generated in any order as long as the format of the print data 305 is followed.

In step S706 of FIG. 6, the print data generation unit 302 acquires referred data for the variable image portion 502 and the variable text portion 503 from the DB 304 to execute the processing of generating the data source 306. Then, the sequence in FIG. 6 is terminated.

FIG. 9A illustrates a table representing the data source 306 output in step S706 in FIG. 6 when the output list 607 in FIG. 5B is selected for the document template 303 in FIG. 4A. The data source 306 includes a plurality of object information related to the referred actual data for the variable portions in the document template 303. Each of the object information in the data source 306 includes a position 901 of print data, a data size 902, and actual data 903. The actual data 903 is represented by a file name, and can be directly read and acquired from a file based on the file name. Thus, the file name and the file itself are not distinguished from each other in the description. For example, in the case of the output list 607 illustrated in FIG. 5B, the data source 306 includes the variable image portion 502 and the variable text portion 503. In FIG. 9A, object information 904 with an ID 001 indicates that the print data position 901 is the 1520th byte from the beginning of the file.

The position 901 of the print data is obtained as the position of a tag from the beginning of the file, the next tag after the start tag starting from the object number in the variable portion of the print data 305 generated in step S705 in FIG. 6. More specifically, in FIG. 7B, the position 901 of the print data is the position (position from the beginning of the file) of the Length tag 807 following the start tag "24 0 obj" as the object number in the variable portion. For example, when the Length tag 807 starts at the 1520th byte from the beginning of the file, the print data position 901 is 1520. The same applies to a start tag "25 0 obj" as the object number in the variable portion in FIG. 8. More specifically, the print data position 901 is a position (position from the beginning of the file) of a Length tag 811. For example, when the Length tag 811 starts at the 15600th byte from the beginning of the file, the print data position 901 is 15600.

The object information 904 with the ID 001 illustrated in FIG. 9A includes a single "A.jpg.dat" as the actual data 903 having the data size 902 of 9630 bytes. The object information 904 with the ID 001 further includes a single "A.txt.dat" as the actual data 903 having the data size 902 of 55 bytes. "A.jpg.dat" includes image data itself and also includes a Length tag representing the data size 902 and a tag indicating the end of the data. The Length tag consists of "<</Length size >>", for example, describing the actual length of the image data, and is followed by the image data. The tag indicting the end of the data is represented by "endobj", indicating an end position of a range of the effective data. Thus, the data size 902 in the data source 306 is of a value obtained by adding the size of the Length tag and the size of the tag indicating the end of the data to the size of the image data. For example, when the total data size of the Length tag and the tag indicating the end of the data is 30 bytes, the data size 902 of the "A.jpg.dat" is obtained by adding 30 bytes to 9600 bytes as the size of the image data itself and thus is 9630 bytes. Similarly, the "A.txt.dat" is provided with the Length tag, the actual text data, and the endobj tag indicating the end of the data in this order from the top. The object information 905 to 907 with the IDs 002 to 004 have similar configurations and thus description thereof will be omitted.

FIG. 9B is an image diagram illustrating "A.jpg.dat" in the object information 904 with the ID 001 in the data source 306. "A.jpg.dat" includes a Length tag 908, actual image data 909, and an endobj tag 910 indicating the end of the data. FIG. 9C is an image diagram of the "A.txt.dat" in the object information 904 with the ID 001 in the data source 306. "A.txt.dat" includes a Length tag 911, actual text data 912, and an endobj tag 913 indicating the end of the data.

Described next is processing, executed by the server 102 and the printer apparatus 104, on the print data 305 and the data source 306 generated by the client 103. To simplify the description below, it is assumed that the data source 306 generated by the client 103 is stored in the server 102, and the printer apparatus 104 refers to the stored data as necessary. It is also assumed that the print data 305 generated by the client 103 is directly transmitted to the printer apparatus 104 to be converted into an appropriate data format in the printer apparatus 104 (raster image processing (RIP)).

Figure 10:
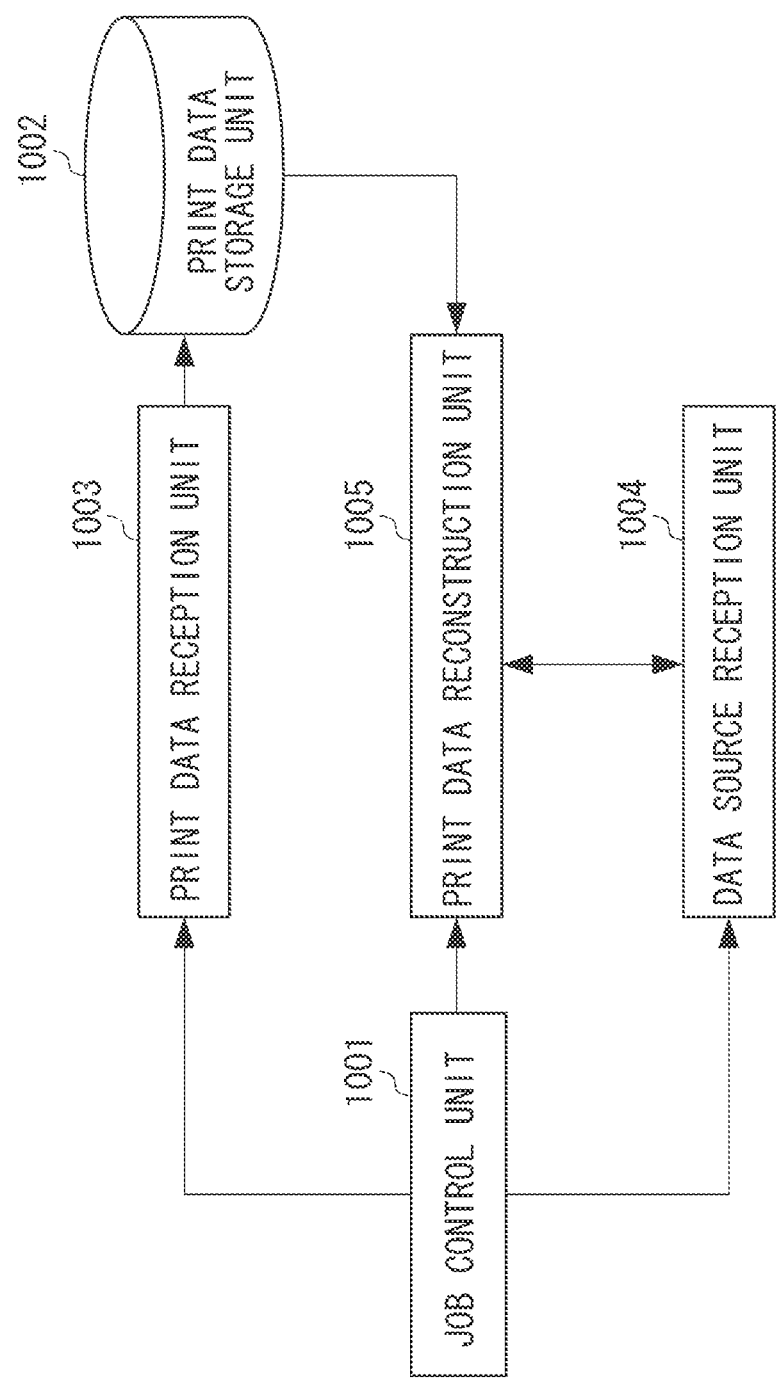
FIG. 10 is a data flow diagram illustrating processing according to the first exemplary embodiment.

FIG. 10 is a data flow diagram illustrating a relationship between a program code and data according to the present exemplary embodiment. The printer apparatus 104 operates in accordance with the data flow diagram illustrated in FIG. 10. A job control unit 1001 controls a print data reception unit 1003, a print data reconstruction unit 1005, and a data source reception unit 1004. A print data storage unit 1002 stores received print data.

The job control unit 1001 handles data input via the input unit 203 illustrated in FIG. 1B, and determines whether the print data storage unit 1002 has received the print data 305. The job control unit 1001 provides an interface for the user to start the printing, and determines whether to start the printing of the received print data 305. The print data reception unit 1003 receives the print data 305 transmitted from the client 103, and stores the received print data 305 in the print data storage unit 1002. The data source reception unit 1004 executes processing of acquiring the data source 306 from the server 102. The print data reconstruction unit 1005 executes reconstruction processing for the print data 305 based on the print data 305 and the data source 306.

An example of the reconstruction processing for the print data 305 executed by the print data reconstruction unit 1005 is described with reference to FIG. 11.

When an instruction to start the printing is issued by a user operation, the job control unit 1001 determines whether all the print data 305 as the printing targets has been received in step S1101. The print data 305 received in step S1101 has been generated by the processing in the flowchart in FIG. 6, and requires processing of changing the stub data applied to the variable portion to the actual data for each record. When the reception of the print data 305 has not been completed (NO in step S1101), the job control unit 1001 waits until the reception of the print data 305 is completed. On the other hand, when the reception of the print data 305 has been completed (YES in step S1101), the processing proceeds to step S1102. In step S1102, the job control unit 1001 determines whether the data source used for the print data 305 has been determined. In this step, the job control unit 1001 waits until a record as the printing target in the data source 306 is determined because the print data 305 is reconstructed for each record. For example, when the four records No1 to No4 in the data source are determined, the job control unit 1001 repeatedly executes the processing in steps S1103 to S1106 four times. When the data source 306 has not been determined (NO in step S1102), the job control unit 1001 waits until the data source 306 is determined.

When the processing proceeds to step S1103 from step S1102 (YES in step S1102), the job control unit 1001 instructs the data source reception unit 1004 to acquire the data source 306 from the server 102 in step S1103. The job control unit 1001 further instructs the print data reconstruction unit 1005 to reconstruct the print data 305 by using the data in the acquired data source 306. In step S1104, the print data reconstruction unit 1005 executes processing of acquiring an offset position of an area to be overwritten with the image data or the text data acquired from the data source 306. For example, the offset positions corresponding to the image data and the text data in the object information 904 with the ID 001 in FIG. 9A are 1520 and 15600, respectively. In step S1105, the print data reconstruction unit 1005 executes processing of overwriting the area starting at the offset position of the print data 305 acquired in step S1104, with the image data or the text data.

FIG. 12 is an image diagram illustrating the print data 305 obtained as a result of the overwriting processing on the print data 305 in the state illustrated in FIG. 8, using the object information 904 with the ID 001 illustrated in FIG. 9A. The reconstructed print data 305 has stub image data 1201 overwritten with image data 1202 acquired from the data source 306. Similarly, the reconstructed print data 305 has stub text data 1203 overwritten with text data 1204 acquired from the data source 306. In the print data 305 input to the printer apparatus 104, the stub data described above with reference to FIG. 6 is overwritten with the actual data acquired from the data source 306. Here, the stub data has been generated to have the largest data size of all the actual data for the overwriting. Therefore, in the reconstructed print data 305, the structure, including the cross reference list 1205, does not collapse after the overwriting, and thus the consistency of the file can be maintained.

In step S1106 in FIG. 11, the print data reconstruction unit 1005 determines whether all the overwriting processing with the image data and the text data in the data source 306 has been completed. When all the overwriting processing has not been completed (NO in step S1106), the processing returns to step S1103 and the processing in steps S1103 to S1105 is repeated. On the other hand, when all the overwriting processing has been completed in step S1106 (YES in step S1106), the sequence in FIG. 11 is terminated.

Figure 4C:
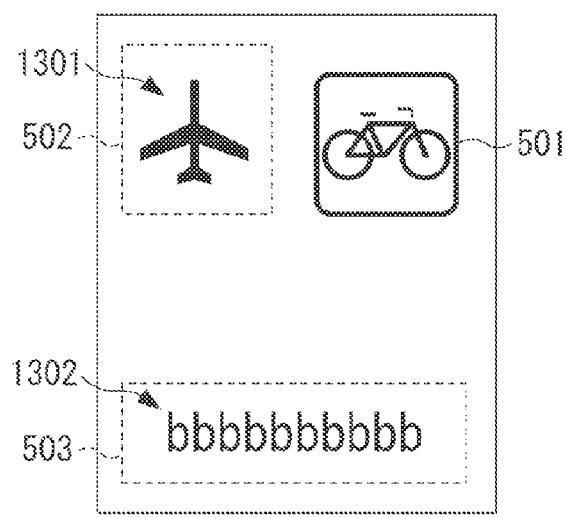

FIG. 4C is an image diagram illustrating the print data 305 at the time of printing. More specifically, the print data 305 in FIG. 4C is obtained by the reconstruction through the processing illustrated in FIG. 11 on the print data 305. Here, an example is illustrated where the object information 904 with the ID 001 in the data source 306 illustrated in FIG. 9A is applied. Each stub data in the print data 305 input to the printer apparatus 104 is updated with the corresponding one of the image data "A.jpg.dat" and the text data "A.txt.dat" acquired from the data source 306. As a result, the print data 305 obtained by the reconstruction includes image data 1301 and text data 1302 as the actual data, as is the case with the preview display of the editing screen illustrated in FIG. 4A.

In the present exemplary embodiment, the stub data is added to the print data 305 in advance, and the stub data is overwritten with the actual data acquired from the data source 306 at the time of the print processing. Thus, the reconstruction processing is executed on the print data 305. The print data 305 is generated in advance by using the stub data having a size not smaller than the size of the actual data received from the data source 306. As a result, the reconstruction processing only involves the overwriting of the area of the stub data with the actual data, and thus can be easily executed. Therefore, according to the present exemplary embodiment, the amount of print data can be suppressed, and thus the processing for combining print data can be simplified.

Next, a second exemplary embodiment of the present invention is described. In the first exemplary embodiment, the configuration has been described in which the stub data with the largest data size is generated in advance based on the actual data with the largest data size and the data reconstruction processing is performed by overwriting the area of the stub data with the actual data. This configuration, in which the stub data is generated to have the largest data size of all the actual data, could be inefficient depending on the size of the actual data. Furthermore, when there is a plurality of variable portions, a plurality of data needs to be processed, and thus the processing could be complicated. In the second exemplary embodiment, a solution to the problems is described. In the present exemplary embodiment, portions that are the same as the counterparts in the first exemplary embodiment are denoted with the reference numerals that have been used, and detail description thereof will be omitted.

An example of processing of generating the print data 305 and the data source 306 according to the present exemplary embodiment is described with reference to FIG. 13.

When the user operates the output button 608 illustrated in FIG. 5B so that the UI control unit 301 instructs the print data generation unit 302 to start the processing, the print data generation unit 302 executes processing of generating the stub image data to be prepared in the print data 305 in step S1401. Then, in step S1402, the print data generation unit 302 executes processing of generating the stub text data to be prepared in the print data 305. The stub image data and the stub text data are not particularly limited, and may be those used for the first record. In step S1403, the print data generation unit 302 executes processing of generating the fixed portion of the print data 305 that does not vary among records.

In step S1404, the print data generation unit 302 uses the stub data generated in steps S1401 and S1402 to execute processing of adding data related to the variable portion, which is variable for each record, to the print data 305 after the processing for the fixed portion. FIGS. 14A and 14B each illustrate an example of the print data 305. The illustrated print data 305 represents examples of data output in steps S1403 and S1404 when the four records illustrated in FIG. 5B are selected for the document template 303 illustrated in FIG. 4A, in the case of a PDF file.

FIG. 14A illustrates an example of the print data 305 output in step S1403. Header information and a fixed portion 1501 of the print data 305 are output in this order from the beginning of the file. FIG. 14B illustrates an example of the print data 305 to which the data related to the variable portion is added in step S1404. More specifically, a variable portion 1502 using the stub image data is added to the print data 305. Similarly, a variable portion 1503 using the stub text data is added to the print data 305. Furthermore, a cross reference list 1504 is added to the print data 305. The cross reference list 1504 includes pointer data indicating positions of the fixed portion 1501, the variable portion 1502 using the stub image data, and the variable portion 1503 using the stub text data, on the file. For example, a reference position 1505 in the fixed portion 1501 of the print data 305, indicated by the pointer, indicates that the fixed portion 1501 starts at the 183th byte from the beginning of the file. A reference position 1506 in the variable portion 1502, indicated by the pointer using the stub image data of the print data 305 indicates that the variable portion 1502 starts at the 1555th byte from the beginning of the file. A reference position 1507 indicated by the pointer to the variable portion 1503 using the stub text data of the print data 305 indicates that the variable portion 1502 starts at the 1655th byte from beginning of the file.

As described above, the print data generation unit 302 executes the processing of adding each of the stub image data and the stub text data to the print data 305.

Figure 13:
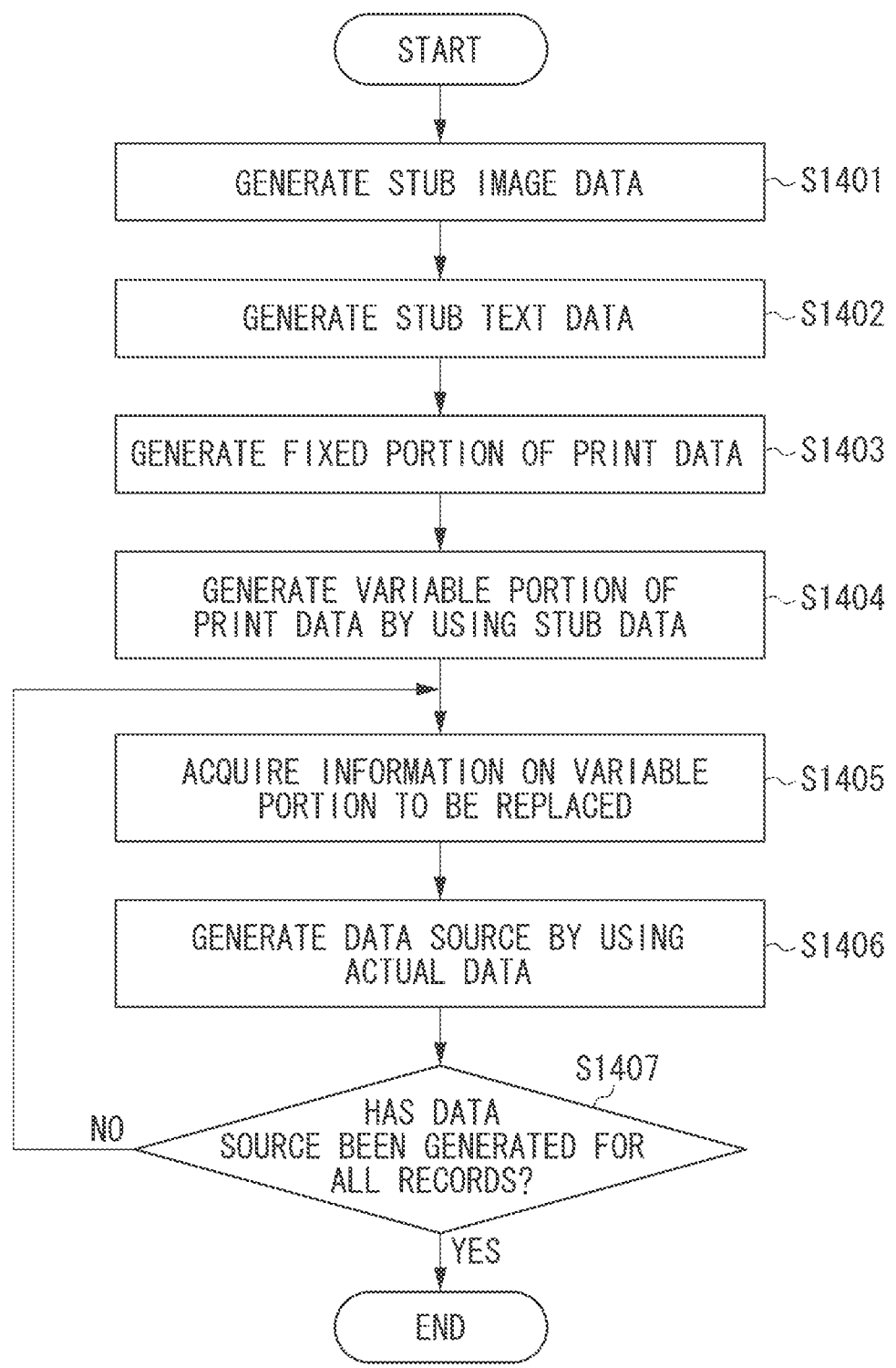
FIG. 13 is a flowchart illustrating an example of processing according to a second exemplary embodiment of the present invention.

In step S1405 in FIG. 13, the print data generation unit 302 executes processing of acquiring the position of the variable portion, to be replaced with the actual data at the time of printing, from the beginning of the file. More specifically, the search is started from the beginning of the file, and the position of the variable portion of the print data 305 to be found first in the search is acquired. For example, in the case of FIG. 14B, there are stub image data and stub text data, and the stub image data is found earlier in the search. Thus, the print data generation unit 302 acquires the position (1555) of the stub image data. Then, the print data generation unit 302 executes processing of generating the data source 306 for each record by using the actual data in step S1406. Then, in step S1407, the print data generation unit 302 executes processing of determining whether the data source 306 has been generated for all the records. When the data source 306 has not been generated for all the records (NO in step S1407), the processing returns to step S1405, and the processing in step S1405 and step S1406 is repeated. When the data source 306 has been generated for all the records (YES in step S1407), the sequence is terminated.

FIG. 15A illustrates a table as an example of the data source 306 generated by the processing in steps S1405 to S1407 in FIG. 13. In FIG. 15A, IDs and replacement data for four records are exemplified. Each entry in the data source 306 includes an updated position 1601, an update size 1602, and actual replacement data 1603. The update size 1602 indicates the number of bytes of data to be updated. The actual replacement data 1603 is represented by a file name, and can be directly read and acquired from the file based on the file name. Thus, the file name and the actual replacement data 1603 are not distinguished from each other in the description. For example, replacement data 1604 with an ID 001 includes the 1555th byte from the beginning of the file as the updated position 1601, 10330 bytes as the update size 1602, and "A.jpg.A.txt.dat" as the actual replacement data 1603. The print data generation unit 302 generates "A.jpg.A.txt.dat" as the replacement data 1604 of the data source 306 in step S1406 in FIG. 13. As a result, in the case of ID 001, the variable portion using the stub data added to the print data 305 in step S1404 is replaced with the data of "A.jpg.A.txt.dat" that has a data size of 10330 bytes and starts at the 1555th byte from the beginning of the file. In the case of the PDF file, not only the image data and the text data but also a tag and a cross reference list conforming to the PDF are added as the actual replacement data 1603. Thus, the consistency can be maintained even when an area extending from an intermediate portion to the end is replaced.

Figure 15B:
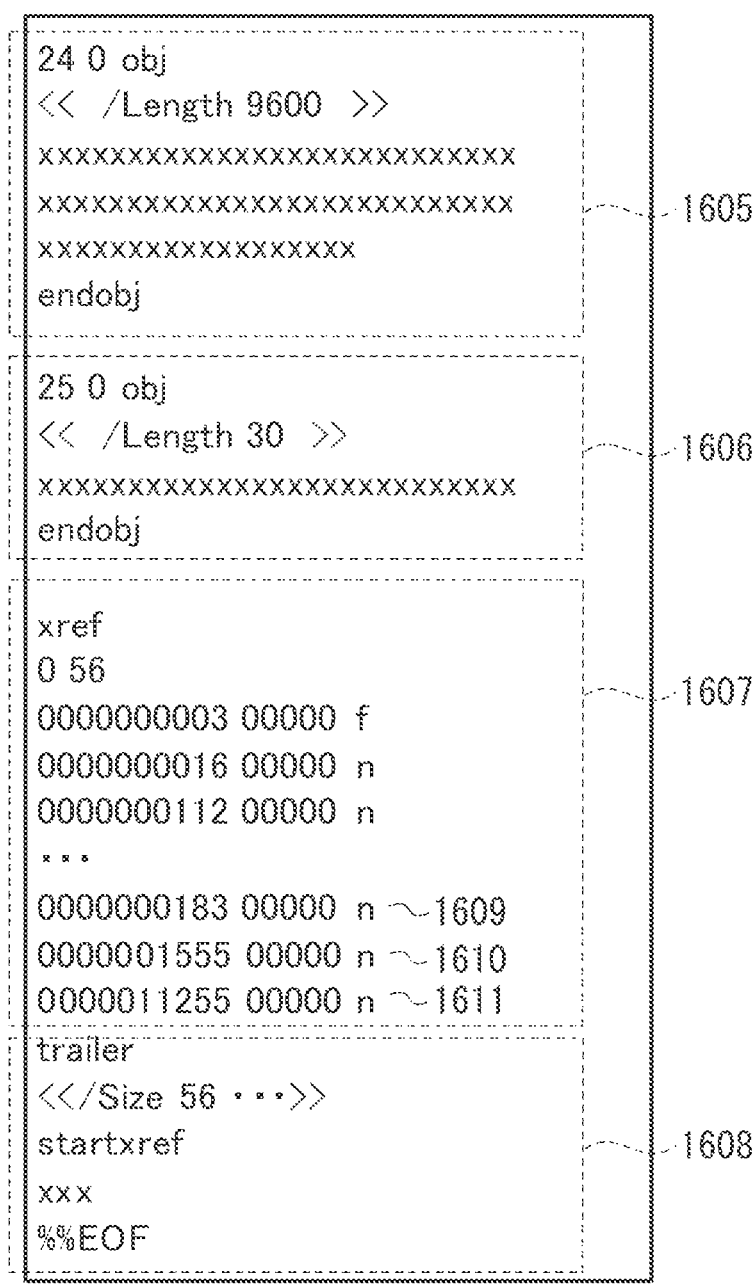

FIG. 15B is an image diagram illustrating "A.jpg.A.txt.dat" in the replacement data 1604 with the ID 001 illustrated in FIG. 15A, which will be described using a case of a PDF file as an example.

The replacement data 1604 with the ID 001 includes a tag indicating the start of the data, a tag indicating the end of the data, a Length tag representing the data size in addition to the actual data of the image data and the text data. The tag indicating the start of the data in definition information 1605 of the image data is written as "24 0 obj", as is the case with the stub image data. The Length tag, where the data length such as "<</Length 9600 >>" is written for example, is positioned right below the tag. In the definition information 1605 of the image data, the actual data of the image itself is written right below the Length tag, and a tag "endobj" is added at the end of the data. Similarly, the tag indicating the start of the data in definition information 1606 of the text data is written as "25 0 obj", as is the case with the stub text data. The Length tag, where the data length such as "<</Length 30 >>" is written for example, is positioned right below the tag. The actual data of the text itself is written right below the Length tag, and a tag "endobj" is added at the end of the data. A cross reference list 1607 and a trailer 1608 are added at the end, so that an area from an intermediate portion to the end of the print data 305 can be replaced. The cross reference list 1607 includes position data 1609 of a pointer to the fixed portion of the print data 305. The position data 1609 is followed by position data 1610 of a pointer to a variable portion of the print data 305. The structure thus achieved may be the same as that of the cross reference list 1504 generated in step S1404 in FIG. 13. The print data generation unit 302 writes position data 1611 of a pointer to a variable text portion in the print data 305 in the cross reference list 1607. Because the size of the actual image data is different from that of the stub image data, the position data 1611 needs to be changed in accordance with a size of actual image data.

As described above, the print data generation unit 302 executes the processing of generating the data source 306 for each record.

Figure 16:
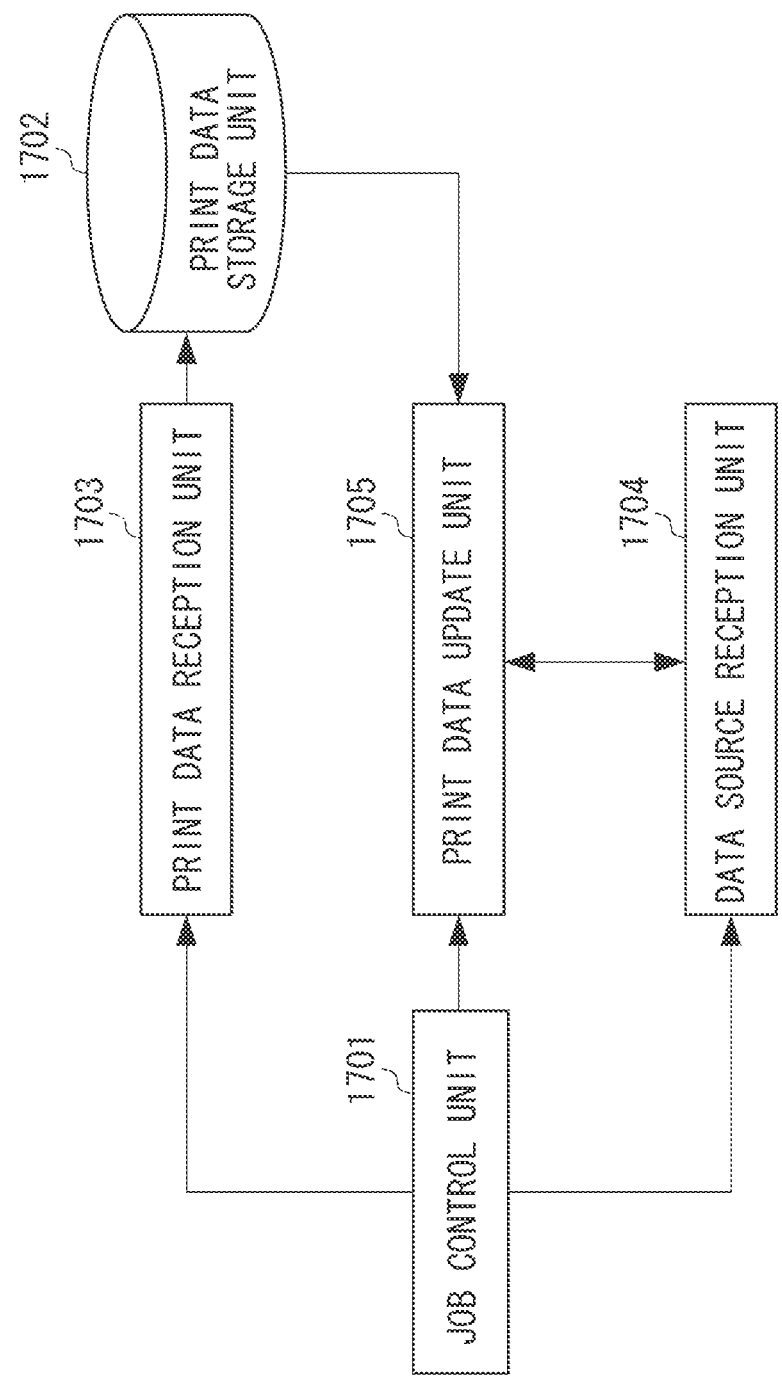
FIG. 16 is a data flow diagram illustrating processing according to the second exemplary embodiment.

Next, processing executed by the server 102 and the printer apparatus 104 on the print data 305 and the data source 306 generated by the client 103 is described with reference to FIG. 16. FIG. 16 is a data flow diagram illustrating a relationship between a program code and data processed according to the present exemplary embodiment. The data flow diagram is the same as that in FIG. 10 except that the print data reconstruction unit 1005 is replaced with a print data update unit 1705.

A job control unit 1701 determines whether print data storage unit 1702 has received the print data 305, and determines whether to start printing of the received print data, in accordance with a user operation. The print data update unit 1705 acquires the print data 305 received by a print data reception unit 1703 and stored in the storage unit 1702 and the data source 306 received by a data source reception unit 1704 from the server 102. The print data update unit 1705 executes update processing on the print data 305 by using the data thus acquired.

An example of the processing of updating the print data 305 based on the print data 305 and the data source 306 is described with reference to FIG. 17.

When an instruction to start the printing is issued by a user operation, the job control unit 1701 determines whether the print data 305 has been received from the client 103 in step S1801. When the reception of the print data 305 as the printing target has not been completed (NO in step S1801), the job control unit 1701 waits until all the print data 305 as the printing target is received. When the reception of the print data 305 has been completed (YES in step S1801), the processing proceeds to step S1802. In step S1802, the job control unit 1701 determines whether the data source 306 for each record used in the print data 305 has been determined. When the data source 306 has not been determined (NO in step S1802), the job control unit 1701 waits until the data source 306 is determined. When the data source 306 has been determined (YES in step S1802), the processing proceeds to step S1803. In step S1803, the job control unit 1701 instructs the data source reception unit 1704 to acquire the data source 306 from the server 102. The job control unit 1701 further instructs the print data update unit 1705 to update the print data 305 by using the acquired data source 306. The print data update unit 1705 executes processing of updating an area of the print data 305 starting from a predetermined position using replacement data in the acquired data source 306, and this sequence is terminated.

FIG. 18 is an image diagram illustrating the print data 305 obtained as a result of the update processing. An example described below is a case of the print data 305 obtained as a result of the update processing on the print data 305 in FIG. 14B using replacement data 1604 with the ID 001 in the data source 306 in FIG. 15A. Processing of acquiring an update position 1601, an update size 1602, and actual replacement data 1603 is executed. In updated data 1901, an area starting from the update position 1601 is overwritten with the replacement data 1902. More specifically, in the case of the replacement data 1604 with the ID 001, the print data update unit 1705 executes the processing of updating an area starting from the 1555th byte from the beginning of the file with the "A.jpg.A.txt.dat" of 10330 bytes. In the updated print data 305, not only a variable portion 1903 but also a cross reference list 1904 are updated, and the updated print data 305 holds position data 1905 of a pointer to the fixed portion of the print data 305.

In the present exemplary embodiment, the stub data is added to the print data 305 in advance, and the update processing is executed using the replacement data acquired from the data source 306 at the time of printing. The data size of the stub data is not limited, and thus only single replacement data is required for each record even when data to be referred to for a plurality of variable portions is acquired from the data source 306. Therefore, no complicated processing is required. As a result, the amount of print data 305 can be suppressed, and thus the processing for combining print data can be simplified.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-085866, filed Apr. 17, 2014, which is hereby incorporated by reference herein in its entirety.

What is claimed is:

1. An information processing system comprising:
a printer apparatus; and
an information processing apparatus, wherein the information processing apparatus comprises:
a processor, and
a memory coupled with the processor, the memory containing instructions that, when executed by the processor, cause the processor to perform operations comprising:
acquiring a largest data size from among data sizes of all data to be used for a variable portion of a document template,
generating stub data having same data size as the acquired largest data size,
generating print data by using the document template and the generated stub data, wherein the generated print data includes a fixed portion of the document template, the stub data, and a reference list which includes a reference position information indicating a position from which the stub data starts in the generated print data, and
generating a data source including data to be referred to at a time of printing for the variable portion, and
wherein the printer apparatus receives the generated print data and the generated data source, and
reconstructs the received print data by overwriting the stub data in the received print data with the received data source.

2. An information processing apparatus to be used in an information processing system configured to process print data, the information processing apparatus comprising:
a processor; and
a memory coupled with the processor, the memory containing instructions that, when executed by the processor, cause the processor to perform operations comprising:
acquiring a largest data size from among data sizes of all data to be used for a variable portion of a document template,
generating stub data having same data size as the acquired largest data size,
generating print data by using the document template and the generated stub data, wherein the generated print data includes a fixed portion of the document template, the stub data, and a reference list which includes a reference position information indicating a position from which the stub data starts in the generated print data, and
generating a data source including data to be referred to at a time of printing for the variable portion.

3. An information processing method executed by an information processing system which includes an information processing apparatus and a printer apparatus, the information processing method comprising:
acquiring, by the information processing apparatus, a largest data size from among data sizes of all data to be used for a variable portion of a document template;
generating, by the information processing apparatus, stub data having same data size as the acquired largest data size;
generating, by the information processing apparatus, print data by using the document template and the generated stub data, wherein the generated print data includes a fixed portion of the document template, the stub data, and a reference list which includes a reference position information indicating a position from which the stub data starts in the generated print data;
generating, by the information processing apparatus, a data source including data to be referred to at a time of printing for the variable portion;
receiving, by the printer apparatus, the generated print data and the generated data source; and
reconstructing, by the printer apparatus, the received print data by overwriting the stub data in the received print data with the received data source.

4. A non-transitory computer readable storage medium storing a program for causing an information processing system, which includes an information processing apparatus and a printer apparatus, to perform an information processing method, the information processing method comprising:
acquiring, by the information processing apparatus, a largest data size from among data sizes of all data to be used for a variable portion of a document template;
generating, by the information processing apparatus, stub data having same data size as the acquired largest data size;
generating, by the information processing apparatus, print data by using the document template and the generated stub data, wherein the generated print data includes a fixed portion of the document template, the stub data, and a reference list which includes a reference position information indicating a position from which the stub data starts in the generated print data;

generating, by the information processing apparatus, a data source including data to be referred to at a time of printing for the variable portion;

receiving, by the printer apparatus, the generated print data and the generated data source; and reconstructing, by the printer apparatus, the received print data by overwriting the stub data in the received print data with the received data source.

5. A non-transitory computer-readable storage medium storing a program for causing an information processing apparatus to perform a method, wherein the information processing apparatus is to be used in an information processing system configured to process print data, the method comprising:

acquiring a largest data size from among data sizes of all data to be used for a variable portion of a document template, generating stub data having same data size as the acquired largest data size, generating print data by using the document template and the generated stub data, wherein the generated print data includes a fixed portion of the document template, the stub data, and a reference list which includes a reference position information indicating a position from which the stub data starts in the generated print data, and generating a data source including data to be referred to at a time of printing for the variable portion.

\* \* \* \* \*